United States Patent

Pong

Patent No.: US 6,341,337 B1
Date of Patent: *Jan. 22, 2002

(54) APPARATUS AND METHOD FOR IMPLEMENTING A SNOOP BUS PROTOCOL WITHOUT SNOOP-IN AND SNOOP-OUT LOGIC (75) Inventor: Fong Pong, Mountain View, CA (US)

(73) Assignee: Sun Microsystems, Inc., Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/016,208

(22) Filed: Jan. 30, 1998

(51) Int. Cl.[7] ............................ G06F 12/00; G06F 13/00
(52) U.S. Cl. ........................ 711/146; 711/133; 711/144; 711/148
(58) Field of Search ............................. 711/3, 118, 119, 711/130, 133, 144, 145, 146, 148, 154, 167

(56) References Cited

U.S. PATENT DOCUMENTS

| 5,335,335 A | | 8/1994 | Jackson et al. ............ 395/425 |
|---|---|---|---|
| 5,513,335 A | | 4/1996 | McClure .................... 395/457 |
| 5,535,363 A | | 7/1996 | Prince ....................... 395/474 |
| 5,559,987 A | | 9/1996 | Foley et al. ............... 395/471 |
| 5,684,977 A | * | 11/1997 | Loo et al. .................. 711/143 |
| 5,706,463 A | * | 1/1998 | Ebrahim et al. ........... 711/120 |
| 5,749,095 A | * | 5/1998 | Hagersten .................. 711/141 |
| 5,822,765 A | * | 10/1998 | Boatright et al. .......... 711/146 |
| 5,881,303 A | * | 3/1999 | Hagersten et al. ........... 712/30 |
| 5,887,138 A | * | 3/1999 | Hagersten et al. ......... 709/215 |
| 5,897,657 A | * | 4/1999 | Hagersten et al. ......... 711/145 |
| 5,950,226 A | * | 9/1999 | Hagersten et al. ......... 711/124 |

* cited by examiner

Primary Examiner—Tuan V. Thai
(74) Attorney, Agent, or Firm—Pennie & Edmonds LLP (57) ABSTRACT The present invention is a method and apparatus that implements a snoop protocol in a multiprocessor system without the use of snoop-in and snoop-out logic units. The multiprocessor system includes a number of nodes connected by a bus operated in accordance with a snoop protocol and the MOSI cache coherency protocol. Each node includes a cache memory and a main memory unit including a shared memory region that is distributed in one or more of the cache memories of the nodes in the system. Each node includes a memory access unit having an export cache that stores identifiers associated with data blocks that have been modified by another node. Each data block in the main memory unit is associated with a state bit that indicates whether the data block is valid or invalid. The export cache and the state of each memory data block is used to determine whether a node should transmit a fetched data block to an initiator node in response to a read miss transaction. In this manner, the bus traffic is reduced since only the valid copy of the requested data item is transmitted to the initiator node.

8 Claims, 6 Drawing Sheets

APPARATUS AND METHOD FOR IMPLEMENTING A SNOOP BUS PROTOCOL WITHOUT SNOOP-IN AND SNOOP-OUT LOGIC

BRIEF DESCRIPTION OF THE INVENTION

The present invention relates generally to memories in computer systems. More particularly, the invention relates to a snoop mechanism for use in a bus-based cache coherent multiprocessor system.

BACKGROUND OF THE INVENTION

Modern computer systems utilize various technologies and architectural features to achieve high performance operation. One such technology employs several central processing units (CPUS) or processors arranged in a multiprocessor configuration. In addition to the processor units such a multiprocessor system can include several I/O modules and a memory module, all coupled to one another by a system bus. The capabilities of the overall system can be enhanced by providing a cache memory at each of the processor units in the multiprocessor system.

Cache memories are used to improve system performance. A cache memory is a relatively small, fast memory which resides between a central processor and main system memory. Whenever the processor reads data in the cache memory, the time required to access the main system memory is avoided. Thus, a cache memory improves system performance.

In a multiprocessor system, the capability of the system can be enhanced by sharing memory among the various processors in the system and by operating the system bus in accordance with a snooping bus protocol. The snooping bus protocol is used to maintain cache coherency. In shared memory multiprocessor systems, it is necessary that the system store a single correct copy of data being processed by the various processors of the system. Thus, when a processor writes to a particular data item stored in its cache, that copy of the data item becomes the latest correct value for the data item. The corresponding data item stored in main memory, as well as copies of the data item stored in other caches in the system, becomes outdated or invalid.

The snooping protocol provides the necessary cache coherency between the various cache memories and main memory. In accordance with the snooping protocol, each processor monitors or snoops the bus for bus activity involving addresses of data items that are currently stored in the processor's cache memory. Status bits are maintained in a tag memory associated with each cache to indicate the status of each data item currently stored in the cache. A processor looks up each address in its cache memory, determines if it is there, and determines the appropriate action to take in response to the snooped command and address. The cache coherency protocol dictates the manner in which the state of the cache line is maintained in each cache memory and which processor provides the requested data.

One such cache coherency protocol is the MOSEI protocol which is associated with the following five cache tag states:

Exclusive Modified (M): the data block stored in the cache line corresponding to this tag has been modified by the data processor coupled to the cache and is not stored in any other cache memories.

Shared Modified (O): the data block stored in the cache line corresponding to this tag has been modified by the data processor coupled to this cache and may be stored in one or more other cache memories.

Exclusive Clean (E): the data block stored in the cache line corresponding to this tag has not been modified by the data processor coupled to this cache and is not stored in any other cache memories.

Shared Clean (S): the data block stored in the cache line corresponding to this tag has not been modified by the processor coupled to the cache, and the cache line can be stored in one or more other cache memories.

Invalid (I): the cache index and cache line contents are invalid.

Figure 1:
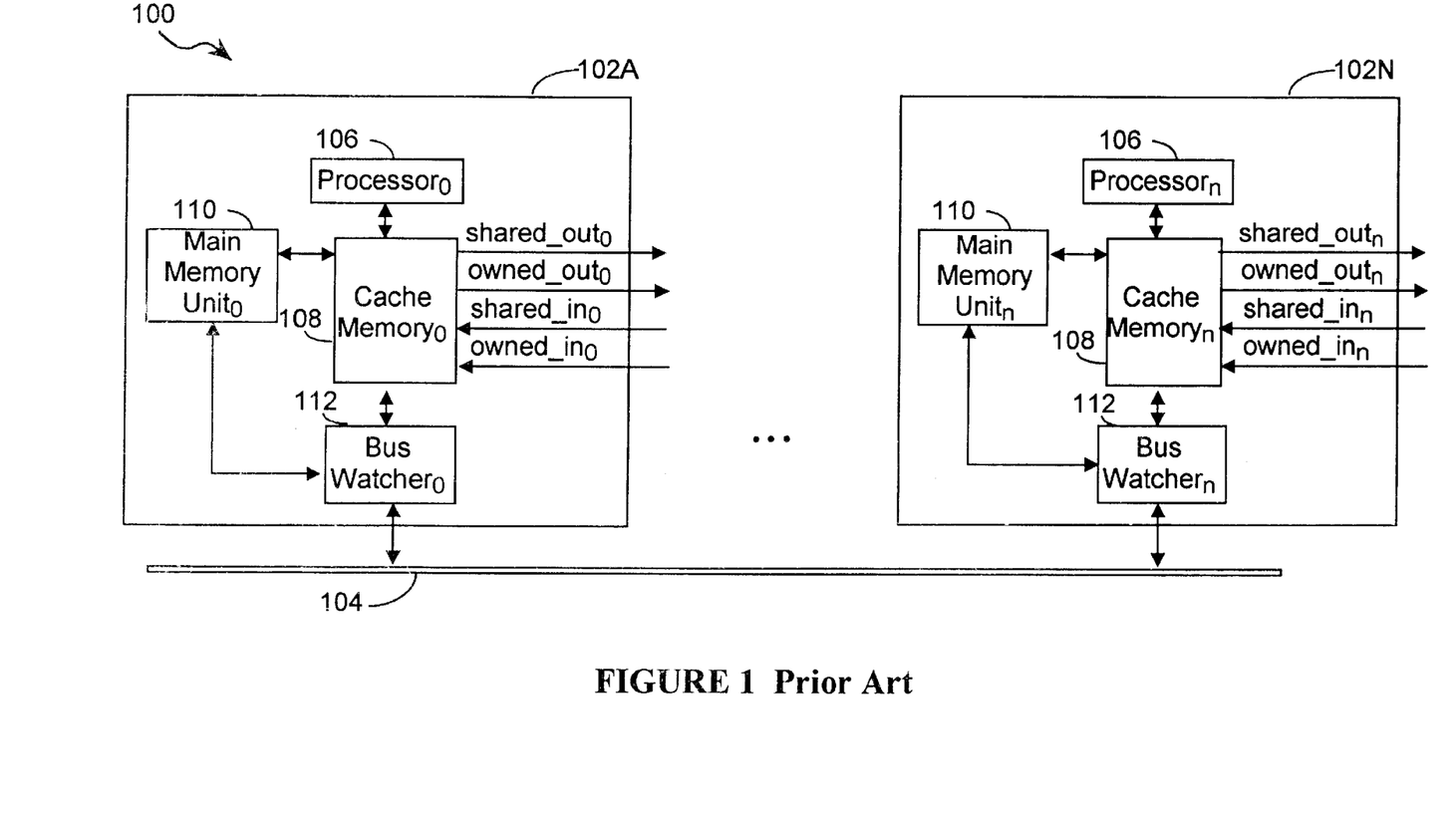
FIG. 1 illustrates a prior art computer system using a snoop-in and snoop-out logic mechanism.

FIG. 1 illustrates a prior art shared memory cache coherent multiprocessor system 100 using snoop-in and snoop-out logic to service snooped requests in accordance with a MOSEI cache coherency protocol. There is shown one or more processor modules or nodes 102A–102N connected to a bus interconnect structure 104 operated in accordance with a snoop protocol. Each node 102 includes a processor 106, a cache memory 108, a main memory unit 110, a bus watcher 112 as well as other components not shown. The main memory unit 110 stores data that is local to the node 102 and data that is shared in one or more of the nodes 102. This data can also be resident in the cache memory 108. Each node 102 is associated with a specific address range of the shared memory.

The cache memory 108 is coupled to the main memory unit 110 and the bus watcher 112. The cache memory 108 attempts to service the memory requests received from the processor 106 from either the cache memory 108 or the main memory unit 110. In the event the requested data cannot be obtained by the memories associated with the processor, the request is broadcasted on the snoop bus 104.

The bus watcher 112 is used to monitor the memory requests broadcasted on the snoop bus 104 which pertain to the data resident in the node's cache memory 108 or associated with the node 102. When a read miss transaction is snooped from the snoop bus 104, the bus watcher 112 transmits the request to the cache memory 108. If the requested data item is stored in the cache memory 108, the state associated with the cache line is returned as will be described below. If the requested data item is associated with the processor's shared memory address range, the data item is fetched from the main memory unit 110 and transmitted to the requesting node 102.

This particular multiprocessor system 100 uses snoop-in and snoop-out logic to implement the snoop protocol. The snoop-in logic includes a set of shared-in and owned-in signals and associated logic components and the snoop-out logic includes a set of shared-out and owned-out signals and associated logic components. Each processor's cache memory 108 receives a shared__in and owned__in signal and transmits a shared__out and owned__out signal. The shared__out signal is used to indicate whether the data associated with a snooped address is stored by the processor in the shared state (i.e., stored in the 'E' or 'S' state in accordance with the MOSEI protocol) and when the snooped command is a read miss. The owned__out signal is used by each processor to indicate whether the data associated a snooped address is owned by the processor and may have been modified by the processor (i.e., stored in the 'M' or 'O' state in accordance with the MOSEI protocol).

The shared__in signal is used to indicate whether the snooped cache line is shared. The processor initiating the snooped request uses this signal to store the requested cache line in either the 'E' or 'S' state. The cache line is stored in the 'E' state when the signal indicates that the cache line is not shared by another processor and the cache line is stored in the 'S' state when the signal indicates that the cache line is shared by one or more processors. The owned_in signal is used to indicate that the processor is to provide the requested cache line.

Figure 2A:
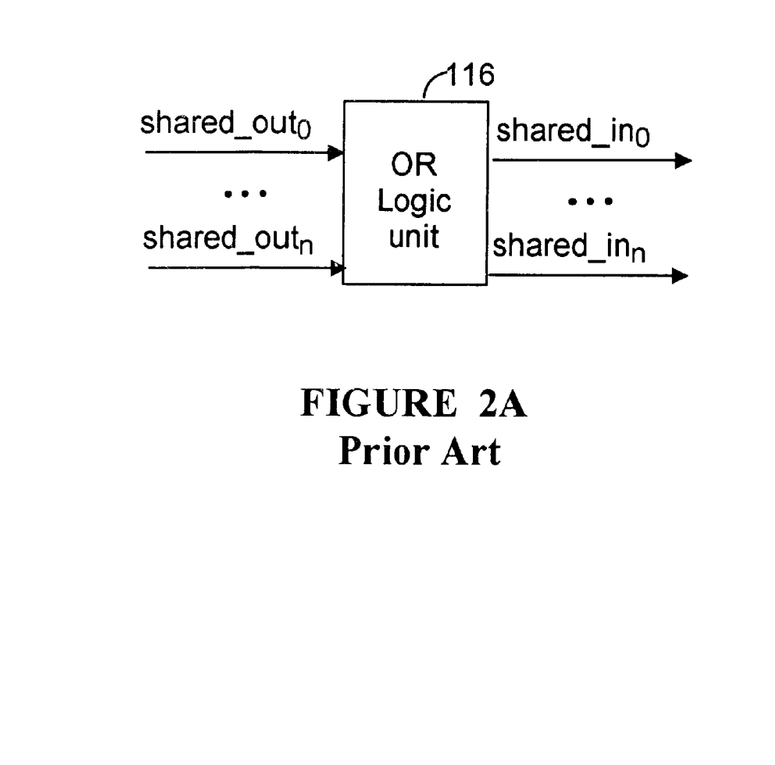
FIGS. 2A–2B illustrate the use of the snoop-in and snoop-out logic mechanisms described in the prior art computer system shown in FIG. 1.
Figure 2B:
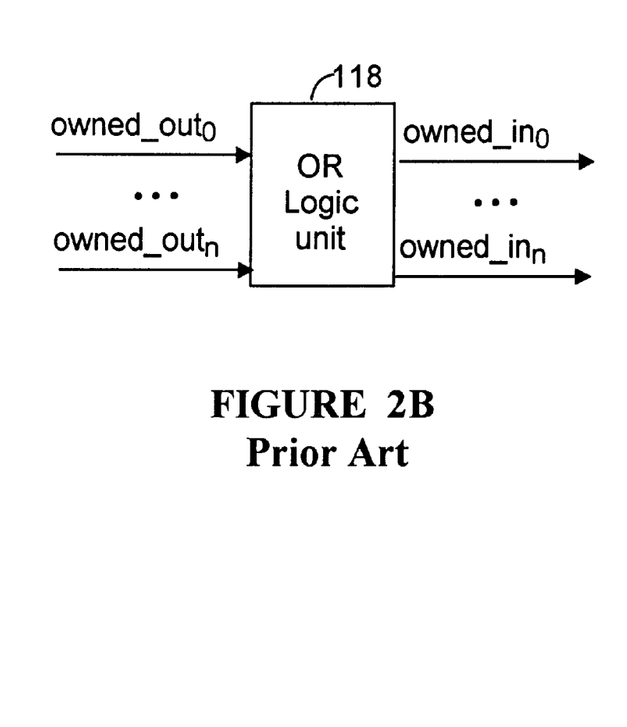

At each snoop cycle, the bus watcher 112 snoops a requested address and command from the bus 104. The shared_out signals from each processor is set accordingly and transmitted to a first OR logic unit 116 which generates the corresponding shared_in signals, as shown in FIG. 2A. The owned_out signals from each processor are also set and transmitted to a second OR logic unit 118 which generates the corresponding owned_in signals, as shown in FIG. 2B. A processor asserting its shared_out signal provides the requested data and alters the state of the cache line in accordance with the MOSEI protocol. The processor receiving a shared_in signal that is asserted stores the requested data in the corresponding MOSEI state.

At the same time that each processor 106 snoops a requested address and command from the bus 104, the main memory unit 110 in the processor 106 associated with the address is accessed. In the case of a read miss, the requested data is fetched from the associated main memory unit 110 and transmitted to the initiating processor 106. The main memory access is performed in parallel with the cache lookup by each processor 106 in order to reduce the memory latency when the requested data in not found in any processor 106. In the event the fetched memory data is not needed, the initiating processor 106 disregards the data.

The use of the snoop-in and snoop-out logic to implement the snoop protocol has several drawbacks. First, such logic requires that each processor generates the snoop result (i.e., set snoop-out signals) during the same cycle. This timing constraint is complicated by the fixed latency time incurred between receiving the bus request and in generating the snoop result. In addition, the snoop-in and snoop-out logic serializes the snoop results which limits the system throughput. Furthermore, the practice of transmitting the requested data from main memory needlessly increases the data bus bandwidth.

Accordingly, there exists a need for a snoop mechanism that can overcome these shortcomings.

SUMMARY OF THE INVENTION

The present invention is a method and apparatus that implements a snoop protocol in a multiprocessor system without the use of snoop-in and snoop-out logic. The multiprocessor system includes a number of nodes connected by a bus operated in accordance with a snoop protocol. Each node includes a cache memory and a main memory unit including a shared memory region that is distributed in one or more of the cache memories of the nodes in the system. Each node is associated with a specified portion of the shared memory. The snoop protocol maintains the shared memory in a consistent state. In a preferred embodiment, the system utilizes the MOSI cache coherency protocol.

The snoop bus is used by an initiator node to broadcast a read miss transaction. In this case, each node searches its cache memory for the requested address. If the address is found in the cache memory and is associated with a 'M' or 'O' state, the data block in the cache memory is returned to the initiator node. In addition, the node storing the data block in its main memory unit fetches the data from main memory. However, the fetched data block is not returned to the initiator node if the requested data was modified by another node.

Each node includes a memory access unit having an export cache that stores identifiers associated with data blocks that have been modified in another processor's cache. Each data block in the main memory unit is associated with a state bit that indicates whether the data block is valid or invalid. A data block is valid if it has not been modified by another node and a data block is invalid if it has been modified by another node. The export cache and the state of each memory data block is used to determine whether a node should transmit a fetched data block to an initiator node in response to a read miss transaction. In this manner, the bus traffic is reduced since only the valid copy of the requested data item is transmitted to the initiator node.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

Figure 3:
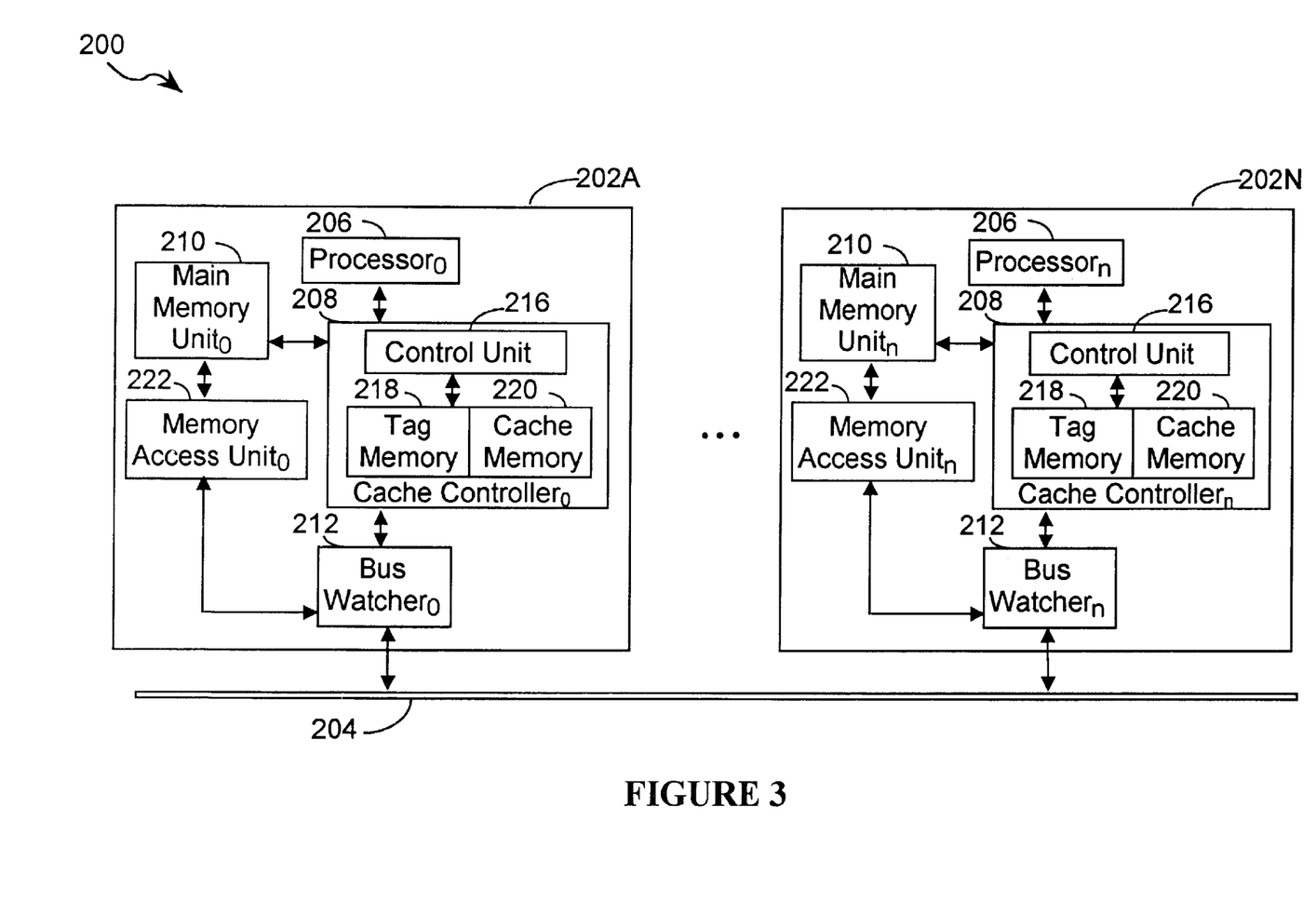
FIG. 3 illustrates a computer system in a preferred embodiment of the present invention.

FIG. 3 illustrates a computer system 200 embodying the technology of the present invention. There is shown several nodes 202A–202N connected to a bus interconnect structure 204. Each node 202 includes a processor 206, a cache controller 208, a main memory unit 210, a bus watcher 212, and a memory access unit 222. The processor 206 can be a microprocessor such as but not limited to the Sun SPARC™ microprocessor, a CPU, or other type of processing element.

The main memory unit 210 can include one or more memory devices such as but not limited to random access memory (RAM) and the like. The main memory unit 210 includes a shared memory region that is accessible by one or more of the nodes 202. The shared memory data associated with a particular node can be stored in the cache memory 208 of another node 202 and in its own cache memory 208. Each main memory unit 210 in each node claims ownership of the shared memory resident in its main memory unit which corresponds to a specific address range. Each data block in the shared memory region of the main memory unit 210 is associated with a one-bit state indicating whether the data block is valid (i.e., memory valid (MV)) or invalid (i.e., memory invalid (MI)). Initially, all data blocks are associated with the MV state. An MI state is associated with a data block that has been modified and cached by another node 202.

The bus watcher 212 is coupled to the bus 204 which in a preferred embodiment is operated in accordance with a snoop bus protocol. The bus watcher 212 is also coupled to a memory access unit 222. The bus watcher 212 monitors the transactions broadcasted on the snoop bus 204. A transaction typically consists of an address and a command. The bus watcher 212 transmits those transactions having an address that is associated with the node's shared memory range and pertaining to a read miss command to the memory access unit 222 in order to fetch the requested data from the main memory unit 210. In addition, the bus watcher 212 transmits all transactions to the cache controller 208 in order to determine whether the requested data is resident in the node's cache memory 220.

The cache controller 208 is coupled to the processor 206, the bus watcher 212, and the main memory unit 210. The cache controller 208 services data requests initiated by the processor 206 and the bus watcher 212. The cache controller 208 includes a control unit 216, a tag memory 218, and a cache memory 220. The tag memory 218 stores the tags associated with each data item resident in the cache memory 220 as well as the state associated with each tag.

In a preferred embodiment, the cache coherency protocol adheres to the MOSI protocol which consists of the following four states:

Exclusive and Potentially Modified (M): The data block stored in the cache line corresponding to this tag may have been modified by the associated processor and the data block is not stored in another node.

Shared Modified (O): The data block stored in the cache line corresponding to this tag has been modified by the processor and the data block may be stored in another node;

Shared Clean (S): The data block stored in the cache line corresponding to this tag has not been modified by the associated processor and the data block may be stored in another node; and Invalid (I): The cache line is invalid.

The technology of the present invention can accommodate a cache controller utilizing the MOSEI protocol. In this case, the five state MOSEI protocol can be reduced to the four state MOSI protocol by removing the 'E' state associated with the MOSEI protocol and replacing it with the 'S' state of the MOSI protocol.

The cache memory 220 can store local memory as well as shared memory that is associated with any node 202. Preferably, the cache block size is 128 bytes. In response to data requests received by the cache controller 208, the cache controller fetches the requested data from the cache memory 220, the main memory unit 210, or generates a request for the data that is broadcasted on the snoop bus 204.

The memory access unit 222 is coupled to the main memory unit 210 and the bus watcher 212. The memory access unit 222 tracks the data blocks of shared memory associated with the node that are resident in other nodes. The memory access unit also determines whether the requested data is to be fetched from the main memory unit 210 and fetches the data when such access is warranted.

Figure 4:
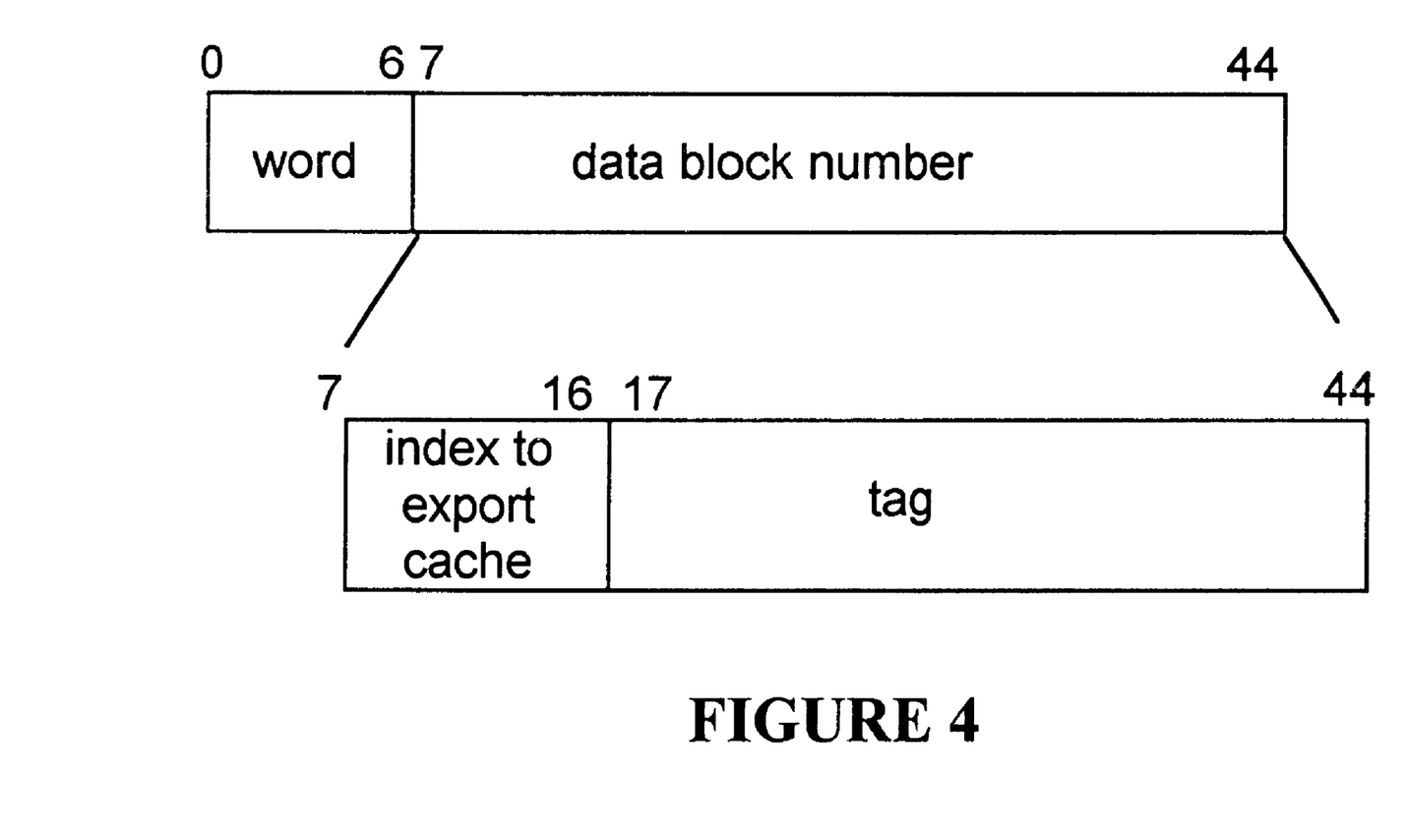
FIG. 4 illustrates an exemplary format of an address in a preferred embodiment of the present invention.

FIG. 4 illustrates a format of a physical address in a preferred embodiment of the present invention. There is shown a 45-bit address where the high order 38-bits (i.e., bits 7–44) identify a data block and the low order 7-bits (i.e., bits 0–6) identify a particular word in the data block. The low-order 10-bits of the data block identifier (i.e., bits 7–16) are used as an index into an export cache and the remaining 28 bits (i.e., bits 17–44) are used as a tag that determines whether the memory block has been exported which is explained in more detail below.

Figure 5:
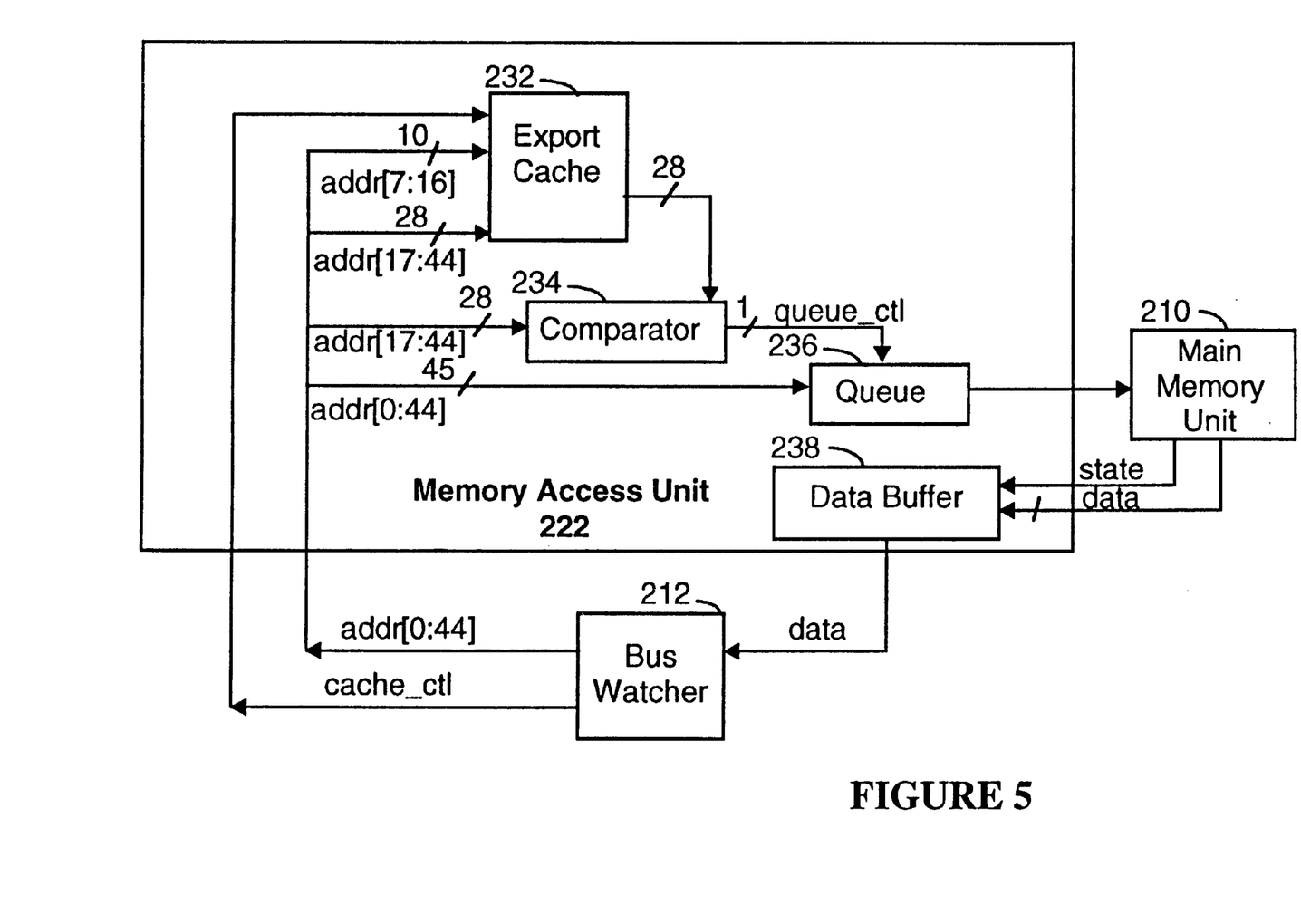
FIG. 5 is a block diagram illustrating the memory access unit in a preferred embodiment of the present invention.

FIG. 5 illustrates the components of the memory access unit 222. The memory access unit 222 is used to determine whether in the case of a read miss, the requested data is to be fetched from main memory. In the prior art, in the case of a read miss, the requested data was fetched from main memory regardless of whether it was needed or not. This was done in order to prevent a subsequent data access cycle. However, this technique increased the demand for memory bandwidth. In the present invention, the requested data is only transmitted to a requesting node if no other processor has a valid copy of the data item. This is accomplished by having the memory access unit track each data block of shared memory that is exported or loaded to another processor. In addition, each data block of shared memory is associated with a memory state indicating whether the memory data block is valid (MV) or invalid (MI). When a data block has not been exported to another node and the data block in its respective main memory unit is valid, then the node transmits the data block to the requesting node. Otherwise, the data block is associated with another node which will provide the data in response to the snoop request.

Referring to FIG. 5, there is shown an export cache 232, a comparator 234, a queue 236 and a data buffer 238. The export cache 232 is a memory device such as but not limited to a RAM that stores an identifier and tag for each data block that is exported and modified by another node 202. Preferably, the export cache 232 can include 1024 entries, the index is the low order 10 bits of the data block identifier of a requested address as shown in FIG. 4 and the tag is the high-order 28-bits of the data block number of a requested address as shown in FIG. 4. The export cache 232 is indexed using the low-order 10 bits of the data block identifier of a requested address as shown in FIG. 4. When the export cache 232 is indexed with a valid entry, the 28-bit tag associated with the index is transmitted to the comparator 234.

The export cache 232 operates under the control of the bus watcher 212. A cache_ctl signal is generated by the bus watcher 212 which is used to control the operation of the export cache 232. When the cache_ctl signal is in the "read" state, the export cache 232 searches for an entry corresponding to the requested index which is addr[7:16]. When the cache_ctl signal is in the "write" state, the export cache 232 writes an entry into the export cache 232 which includes an index and tag. The index is the low order 10 bits of the data block identifier of a requested address as shown in FIG. 4 (i.e., addr[7:16]) and the tag is the high-order 28-bits of the data block number of a requested address as shown in FIG. 4 (i.e., addr[17:44]).

The comparator 234 is coupled to the export cache 232 and a queue 236. The comparator receives the 28-bit tag value stored in the export cache 232 and the high-order 28 bits of the data block number of the requested address (i.e., addr[17:44]. The comparator 234 compares the two values and generates a 1-bit response signal, denoted as queue_ctl, which is transmitted to the queue 236. The queue_ctl signal is used to control when the queue 236 loads in the requested address. When the comparator 234 determines that the two received values are not the same, the queue_ctl signal is set to a high state thereby enabling the queue 236 to load in the requested address (i.e., addr[0:44]). Otherwise, when the comparator 234 determines that the two received values are the same, the queue_ctl signal is set to a low state and the queue 236 ignores the requested address. The queue 236 is coupled to the main memory unit 210 and stores the addresses pending read access to the main memory unit 210.

The data buffer 238 is coupled to the main memory unit 210 and the bus watcher 212. Preferably, a data block is 128-bytes long. A single bit is associated with each data block which when set to a '1' value indicates that the data block is valid (i.e., in the memory valid (MV) state) and when set to a '0' value indicates that the data block is invalid (i.e., in the memory invalid (MI) state). A data block is valid when no other node has a copy of the data block (i.e., located in the 'M' state) or when another node having a copy of the data block has not modified the data block (i.e., other nodes have the data block in the 'S' state or do not have the data block). A data block is invalid when another node has a copy of the data block and has modified the data block (i.e., other nodes have the data block in the 'O' or 'M' state).

The data buffer 238 receives the 1-bit state value associated with the requested data block and uses this value as a control signal that enables the data buffer to load in the requested data word. When the state value is set to a '1' value, the data buffer 238 loads in the requested data word which is then transmitted to the bus watcher 212 which takes the appropriate actions to transmit the data through the snoop bus 204 to the initiator node 202.

Figure 6:
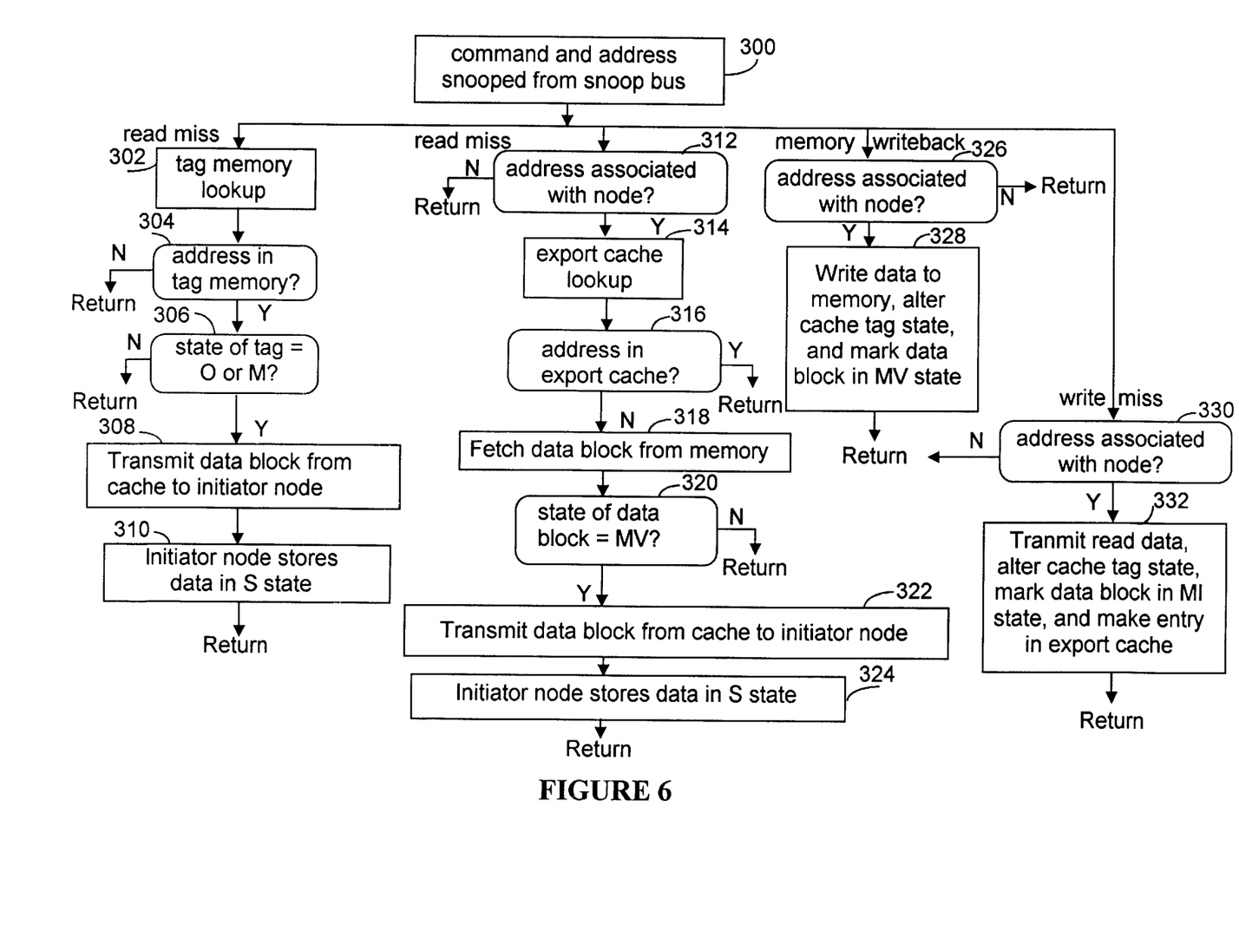
FIG. 6 is a flow chart illustrating the operation of the computer system in accordance with a preferred embodiment of the present invention.

FIG. 6 illustrates the operation of the multiprocessor system 200 in a preferred embodiment of the present invention. The bus watcher 212 snoops command and address data broadcasted over the snoop bus 204 from an initiator node (step 300).

When the command is a read miss, the bus watcher 212 transmits the address to the cache controller 208. The cache controller 208 performs a lookup in the tag memory for the requested address (step 302). If the address is not in the tag memory (step 304-N), no further processing is performed. If the address is found in the tag memory (step 304-Y), the state of the tag is analyzed (step 306). If the state has the value of 'O' or 'M' (step 306-Y), the requested data is fetched from the cache memory and returned to the initiator node (step 308). The 'O' and 'M' states indicate that the node has the most recent copy of the data. The initiator node receiving the data stores the data in the 'S' state (step 310). If the state of the cache line is either 'S' or 'I' (step 306-N), the copy of the requested data item is provided by the main memory unit 210 associated with the address.

Simultaneously with the action of the cache controller 208, the bus watcher 212 determines whether the snooped address corresponds to the shared memory stored in the node's main memory unit 210 (step 312). If the snooped address is not associated with the node 202 (step 312-N), no further action is taken. Otherwise (step 312-Y), the bus watcher 212 transmits the address to the memory access unit 222. The memory access unit 222 searches for the associated address in the export cache 232 as was described above with respect to FIG. 5 (step 314). If the address is in the export cache 232 (step 316-Y), then another node 202 has the most recent copy of the requested data item and will provide the data. Otherwise (step 316-N), the requested data block is fetched from the main memory unit 210 (step 318). The state of the memory data block is analyzed (step 320). If the state of the data block is valid (i.e., MV) (step 320-Y), then the data block is transmitted to the initiator node 202 as was described above with respect to FIG. 5 (step 322). The initiator node 202 stores the data in the 'S' state (step 324). Otherwise (step 320-N), the state of the data block is invalid and another node 202 has the current copy of the data.

In the event a memory writeback transaction is snooped from the snoop bus 204 and the snooped address is associated with the node 202 (step 326-Y), the bus watcher 212 transmits the command and address to the cache controller. Otherwise (step 326-N), the bus watcher ignores the transaction. A memory writeback transaction writes the modified data out to the associated main memory location (step 328).

As such, the state of the memory data block is changed to the MV state and the state of the cache tag memory is altered if necessary in accordance with the cache coherency protocol (i.e., set to 'M' state) (step 328).

In the event of a write miss transaction that corresponds to an address associated with the node (step 330-Y), the bus watcher transmits the transaction to the cache controller (step 332). A write miss transaction allows the initiator node to obtain the requested data in the 'M' state and to invalidate all copies of the data block in the other cache memories. In this case, the cache controller 208 obtains the requested data which is transmitted through the bus watcher 212 to the initiator node 202, marks the memory data block state to 'MI', and alters the cache tag state to 'I' if necessary (step 332). In addition, the bus watcher 212 sets the cache_ctl signal to write an entry into the export cache 232 for this address (step 332).

The foregoing description describes an apparatus and method that determines whether a node should transmit a requested data block to an initiator node in response to a read miss transaction transmitted through a snoop bus. The requested data block is only fetched from main memory and returned to the initiator node when no other node has a modified copy of the data block. In this manner, the bus traffic is reduced since only the valid copy of the requested data item is transmitted to the initiator node. The apparatus of the present invention uses an export cache that tracks memory data blocks exported to another node that has modified the data and a tag associated with each memory data block indicating whether the data block is valid or invalid. The use of the export cache and the memory data block tag eliminates the need for the snoop-in and snoop-out logic of the prior art. The elimination of the snoop-in and snoop-out logic abolishes the need for each processor to generate snoop results in the same snoop cycle. Moreover, each processor need not report its snoop results if the snoop request does not pertain to data stored in the processor's memories.

ALTERNATE EMBODIMENTS

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following Claims and their equivalents.

In an alternate embodiment, the use of the MI/MV bit associated with each memory block can be eliminated if the size of the export cache is made large enough to accommodate each memory block that can be exported and modified by another processor. In this embodiment, the export cache contains an entry for each memory block that has been exported and modified by another processor cache. An entry in the export cache would be cleared when the memory block becomes valid, such as in the case of a memory writeback.

What is claimed is:

1. A computer system comprising:
    a snoop bus;
    a plurality of nodes connected to the snoop bus, each node comprising:
        a processor;
        a main memory unit including a shared memory region associated with a respective node, the shared memory region including a multiplicity of shared memory datums that may be exported to one or more other nodes;
        a cache memory including a portion of the shared memory associated with the node and a portion of the shared memory associated with another node;
        a tag memory associated with the cache memory of the node, the tag memory storing one or more cache memory identifiers, each cache memory identifier identifying a cache memory datum stored in the cache memory of the node; and
        a memory access unit associated with the main memory unit of the node, the memory access unit storing one or more main memory identifiers, each main memory identifier identifying a shared memory datum associated with the respective node that was exported to the cache memory of another node that modified the shared memory datum;
    wherein when a read miss occurs an address is broadcasted on the snoop bus from an initiator node, the node associated with the broadcasted address fetches data stored in the associated main memory unit and transmits the fetched data to the initiator node when a main memory identifier associated with the broadcasted address is not found in the memory access unit.

2. The system of claim 1,
    the main memory unit including one or more data blocks of shared memory, each data block associated with a state identifier, the state identifier indicating whether the corresponding data block is valid or invalid; and
    wherein the case of a read miss, the node associated with the address transmits the fetched data to the initiator node when the state identifier of a data block corresponding to the address is valid.

3. The system of claim 1 wherein the cache memory is operated in accordance with a MOSI cache coherency protocol.

4. A method for accessing data in a computer system including a plurality of nodes connected to a snoop bus operated in accordance with a snoop bus protocol, each node including a processor, a cache memory, a main memory unit and a memory access unit, the method comprising the steps of:
    associating with each main memory unit a shared memory region that is accessible by each node;
    storing in the memory access unit a plurality of identifiers, each identifier representing a data block in the shared memory region associated with the node that has been exported to another node and that has been modified;
    snooping a read miss transaction transmitted on the snoop bus from an initiator node, the read miss transaction including a request address;
    searching the memory access unit for a main memory identifier including the request address;
    when the request address is not found in the memory access unit;
    fetching the corresponding data block from the associated main memory unit;
    transmitting the data block to the initiator node; and
    when the request address is found in the memory access unit, not transmitting the data block from the main memory unit to the initiator node.

5. The method of claim 4, further comprising the steps of:
    storing in the memory access unit a main memory identifier for each data block in the main memory unit, each main memory identifier having a state indicating whether the data block is valid or invalid;
    the transmitting step further comprising the steps of
        searching the main memory identifiers to determine whether the state associated with the data block is valid; and
        transmitting the data block to the initiator node when the state of the main memory identifier associated with the data block is valid.

6. The method of claim 4,
    storing in each cache memory one or more data blocks from the shared memory region associated with one or more nodes;
    associating with each data block in the cache memory a cache memory identifier, each cache memory identifier having a state indicating the status of the data block with respect to all nodes in the system;
    searching for the request address in the cache memory;
    when the request data is found in the cache memory, transmitting the corresponding data block from the cache memory to the initiator node when the corresponding state indicates the data has been modified by the processor associated with the respective node.

7. The method of claim 4, further comprising the steps of:
    snooping a memory writeback transaction from the snoop bus;
    receiving a modified data block;
    writing the modified data block to the main memory unit;
    marking the modified data block with a valid state.

8. The method of claim 4, further comprising the steps of:
    snooping a write miss transaction from the snoop bus from a requesting node;
    transmitting a copy of a data block corresponding to the write miss transaction to the requesting node from the main memory unit;
    marking a main memory identifier associated with the exported data block with an invalid state; and
    placing the main memory identifier associated with the exported data block in the memory access unit.

* * * * *